US012232215B2

(12) United States Patent
Liu et al.

(10) Patent No.: US 12,232,215 B2
(45) Date of Patent: Feb. 18, 2025

(54) METHODS TO ENABLE EFFICIENT UPDATE OF STEERING OF ROAMING (SOR) INFORMATION

(71) Applicant: NOKIA TECHNOLOGIES OY, Espoo (FI)

(72) Inventors: Jennifer Liu, Plano, TX (US); Ulrich Wiehe, Bad Hersfeld (DE)

(73) Assignee: NOKIA TECHNOLOGIES OY, Espoo (FI)

(*) Notice: Subject to any disclaimer, the term of this patent is extended or adjusted under 35 U.S.C. 154(b) by 354 days.

(21) Appl. No.: 17/773,904

(22) PCT Filed: Nov. 5, 2020

(86) PCT No.: PCT/EP2020/081105
§ 371 (c)(1),
(2) Date: May 3, 2022

(87) PCT Pub. No.: WO2021/089688
PCT Pub. Date: May 14, 2021

(65) Prior Publication Data
US 2022/0394456 A1 Dec. 8, 2022

Related U.S. Application Data

(60) Provisional application No. 62/932,310, filed on Nov. 7, 2019.

(51) Int. Cl.
*H04W 8/06* (2009.01)
*H04W 48/18* (2009.01)
*H04W 60/04* (2009.01)
(52) U.S. Cl.
CPC .............. *H04W 8/06* (2013.01); *H04W 48/18* (2013.01); *H04W 60/04* (2013.01)

(58) Field of Classification Search
CPC ........ H04W 8/06; H04W 48/18; H04W 60/04
See application file for complete search history.

(56) References Cited

U.S. PATENT DOCUMENTS

2019/0268752 A1* 8/2019 Buckley .................. H04W 8/06
2019/0313238 A1 10/2019 Palanigounder et al.
2021/0273879 A1* 9/2021 Kumar .................. H04L 45/028

FOREIGN PATENT DOCUMENTS

WO   WO-2015101808 A1 *  7/2015  .............. H04W 8/12
WO   WO 2019/165406 A1    8/2019

OTHER PUBLICATIONS

"3rd Generation Partnership Project; Technical Specification Group Services and System Aspects; System architecture for the 5G System (5GS); Stage 2 (Release 15)" 3GPP TS 23.501 v15.11.0, (Sep. 2020), 250 pages.

(Continued)

*Primary Examiner* — Siu M Lee
(74) *Attorney, Agent, or Firm* — ALSTON & BIRD LLP

(57) ABSTRACT

Methods, computer program products, and apparatuses are provided for enabling efficient update of steering of roaming information. An apparatus may include a processor and a memory storing computer program code configured to cause the apparatus to generate a registration request message associated with a user equipment, said registration request comprising a steering of roaming (SoR) information update request, and cause transmission of said registration request message to a network entity of a mobile network. Alternatively, the memory, computer program code, and processor may be configured to cause the apparatus to receive a registration request message comprising an indication of whether a user equipment expects to receive SoR information, and, in an instance in which it is determined that said user equipment expects to receive SoR information, trigger- (Continued)

ing retrieval of said SoR information from a home network of said user equipment.

20 Claims, 8 Drawing Sheets

(56) References Cited

OTHER PUBLICATIONS

Ericsson, "Discussion on Interactions Between AF-OSDAS and Other Core Network Entities", 3GPP TSG-CT WG1 Meeting #119, C1-194254, (Aug. 26- 30, 2019), 4 pages.
International Search Report and Written Opinion for Patent Cooperation Treaty Application No. PCT/EP2020/081105 dated Feb. 8, 2021, 19 pages.
NTT DOCOMO, "Discussion Paper on SOR During Initial Registration" 3GPP TSG CT WG1 Meeting #120, C1-196180, (Oct. 7-11, 2019), 4 pages.

* cited by examiner

| 8 | 7 | 6 | 5 | 4 | 3 | 2 | 1 | octet 1 |
|---|---|---|---|---|---|---|---|---|
| Additional registration information IEI | | | | spare | spare | spare | SIUR | |

FIG. 2

METHODS TO ENABLE EFFICIENT UPDATE OF STEERING OF ROAMING (SOR) INFORMATION

CROSS-REFERENCE TO RELATED APPLICATIONS

The present application is a national phase entry of International Application No. PCT/EP2020/081105, filed Nov. 5, 2020, which claims the benefit to U.S. Provisional Application No. 62/932,310, filed Nov. 7, 2019, which are each incorporated herein by reference in their entirety.

CROSS-REFERENCE TO RELATED APPLICATIONS

This application claims priority to and the benefit of U.S. Provisional Patent Application No. 62/932,310, filed Nov. 7, 2019, entitled "Methods to Enable Efficient Update of Steering of Roaming Information," the entire disclosure of which is hereby incorporated herein by reference in its entirety for all purposes.

FIELD

The subject matter described herein relates to roaming on wireless networks.

BACKGROUND

As the cellular system including the Fifth Generation (5G) system supports an increasing number of devices and services including applications with a wide range of use cases and diverse needs with respect to bandwidth, latency, and reliability requirements, the cellular system may need to prioritize resources and communications across the wireless access network and the core network (and/or for example, prioritizing across the control plane and the user plane) to support differentiation among different services and enable, e.g., home network operators to steer user equipment while roaming to preferred visited partner networks to enhance the roaming experience, reduce roaming charges, and prevent roaming fraud.

SUMMARY

Methods and apparatus, including computer program products, are provided to enable efficient update of steering of roaming (SoR) information.

In some example embodiments, an apparatus is provided, said apparatus including at least one processor and at least one memory including computer program code, the at least one memory and the computer program code configured to, with the at least one processor, cause the apparatus to at least: generate a registration request message comprising a steering of roaming information update request; and cause transmission of said registration request message to a network entity of a mobile network.

In some embodiments of the apparatus, the registration request message further comprises an indication that a set of conditions has been satisfied, said indication operable for said network entity to determine whether to trigger retrieval of the most up-to-date steering of roaming information from a home network of the apparatus to said apparatus.

In some example embodiments of the apparatus, the registration request message comprises an indication of a registration type, said registration type selected from among an initial registration type, a mobility registration type, or an emergency registration type.

In some example embodiments of the apparatus, the set of conditions is determined to be satisfied if i) the apparatus is configured to expect to receive said steering of roaming information during registration, ii) the registration type is said initial registration type, and iii) said steering of roaming information is not already stored at said apparatus.

In some example embodiments of the apparatus, the set of conditions is determined to be satisfied if i) the apparatus is configured to expect to receive said steering of roaming information during registration, ii) the registration type is said emergency registration type, and iii) said steering of roaming information is not already stored at said apparatus.

In some example embodiments of the apparatus, the set of conditions is determined to be satisfied if i) the apparatus is configured to expect to receive said steering of roaming information during registration, ii) the registration type is one of said initial registration type, said mobility registration type, or said emergency registration type, and iii) steering of roaming information is already stored at said apparatus but said mobile network is determined to be located in a country that is different from a country associated with said steering of roaming information already stored at said apparatus.

In some example embodiments of the apparatus, the set of conditions is determined to be satisfied if i) the apparatus is configured to expect to receive said steering of roaming information during registration, ii) the registration type is one of said initial registration type, said mobility registration type, or said emergency registration type, and iii) steering of roaming information is already stored at said apparatus but said mobile network is determined to be different from a previous mobile network associated with said steering of roaming information already stored at said apparatus.

In other example embodiments, a method is provided for enabling efficient update of steering of roaming information. In some example embodiments of the method, the method can comprise: generating a registration request message associated with a user equipment, said registration request comprising a steering of roaming information update request; and causing transmission of said registration request message to a network entity of a mobile network.

In some example embodiments of the method, the registration request message further comprises an indication that a set of conditions has been satisfied, said indication operable for said network entity to determine whether to trigger retrieval of the most up-to-date steering of roaming information from a home network of the user equipment.

In some example embodiments of the method, the registration request message comprises an indication of a registration type, said registration type selected from among an initial registration type, a mobility registration type, or an emergency registration type.

In some example embodiments of the method, the set of conditions is determined to be satisfied if i) the user equipment is configured to expect to receive said steering of roaming information during registration, ii) the registration type is said initial registration type, and iii) said steering of roaming information is not already stored at said user equipment.

In some example embodiments of the method, the set of conditions is determined to be satisfied if i) the user equipment is configured to expect to receive said steering of roaming information during registration, ii) the registration type is said emergency registration type, and iii) said steering of roaming information is not already stored at said user equipment.

In some example embodiments of the method, the set of conditions is determined to be satisfied if i) the user equipment is configured to expect to receive said steering of roaming information during registration, ii) the registration type is one of said initial registration type, said mobility registration type, or said emergency registration type, and iii) steering of roaming information is already stored at said user equipment but said mobile network is determined to be located in a country that is different from a country associated with said steering of roaming information already stored at said user equipment.

In some example embodiments of the method, the set of conditions is determined to be satisfied if i) the user equipment is configured to expect to receive said steering of roaming information during registration, ii) the registration type is one of said initial registration type, said mobility registration type, or said emergency registration type, and iii) steering of roaming information is already stored at said user equipment but said mobile network is determined to be different from a previous mobile network associated with said steering of roaming information already stored at said user equipment.

In yet other example embodiments, an apparatus is provided, said apparatus comprising: means, such as a user equipment, a mobile computing device, a cell phone, or the like, for generating a registration request message associated with a user equipment, said registration request comprising a steering of roaming information update request; and means, such as a user equipment, a mobile computing device, a cell phone, or the like, for causing transmission of said registration request message to a network entity of a mobile network.

In still other example embodiments, a computer program product is provided, said computer program product comprising a non-transitory computer readable medium including program code which, when executed, causes at least: generating a registration request message associated with a user equipment, said registration request comprising a steering of roaming information update request; and causing transmission of said registration request message to a network entity of a mobile network.

In further example embodiments, an apparatus is provided, said apparatus including at least one processor and at least one memory including computer program code, the at least one memory and the computer program code configured to, with the at least one processor, cause the apparatus to at least: receive, from a user equipment, a registration request message comprising a steering of roaming information update request; determine, based on at least said registration request message, whether said user equipment expects to receive steering of roaming information; and, in an instance in which it is determined that said user equipment expects to receive said steering of roaming information, trigger retrieval of said steering of roaming information from a home network of said user equipment.

In some example embodiments of the apparatus, the registration request message further comprises an indication that a set of conditions has been satisfied, said indication operable for said apparatus to determine whether to trigger retrieval of said steering of roaming information from said home network of said user equipment in response to receiving said registration request message.

In some example embodiments of the apparatus, the registration request message comprises an indication of a registration type, said registration type selected from among an initial registration type, a mobility registration type, or an emergency registration type.

In some example embodiments of the apparatus, the set of conditions is determined to be satisfied if i) the user equipment is configured to expect to receive said steering of roaming information during registration, ii) the registration type is said initial registration type, and iii) said steering of roaming information is not already stored at said user equipment.

In some example embodiments of the apparatus, the set of conditions is determined to be satisfied if i) the user equipment is configured to expect to receive said steering of roaming information during registration, ii) the registration type is said emergency registration type, and iii) said steering of roaming information is not already stored at said user equipment.

In some example embodiments of the apparatus, the set of conditions is determined to be satisfied if i) the user equipment is configured to expect to receive said steering of roaming information during registration, ii) the registration type is one of said initial registration type, said mobility registration type, or said emergency registration type, and iii) said steering of roaming information is already stored at said user equipment but said mobile network is determined to be located in a country that is different from a country associated with said steering of roaming information already stored at said user equipment.

In some example embodiments of the apparatus, the set of conditions is determined to be satisfied if i) the user equipment is configured to expect to receive said steering of roaming information during registration, ii) the registration type is one of said initial registration type, said mobility registration type, or said emergency registration type, and iii) steering of roaming information is already stored at said user equipment but said mobile network is determined to be different from a previous mobile network associated with said steering of roaming information already stored at said user equipment.

In further example embodiments, a method is provided for enabling efficient update of steering of roaming information, said method comprising: receiving, from a user equipment, a registration request message comprising a steering of roaming information update request; determining, based on at least said registration request message, whether said user equipment expects to receive steering of roaming information; and in an instance in which it is determined that said user equipment expects to receive steering of roaming information, providing said steering of roaming information to said user equipment.

In some example embodiments of the method, the registration request message further comprises an indication that a set of conditions has been satisfied, said indication operable for determining whether to provide said steering of roaming information to said user equipment in response to receiving said registration request message.

In some example embodiments of the method, the registration request message comprises an indication of a registration type, said registration type selected from among an initial registration type, a mobility registration type, or an emergency registration type.

In some example embodiments of the method, the set of conditions is determined to be satisfied if i) the user equipment is configured to expect to receive said steering of roaming information during registration, ii) the registration type is said initial registration type, and iii) said steering of roaming information is not already stored at said user equipment.

In some example embodiments of the method, the set of conditions is determined to be satisfied if i) the user equipment is configured to expect to receive said steering of roaming information during registration, ii) the registration type is said emergency registration type, and iii) said steering of roaming information is not already stored at said user equipment.

In some example embodiments of the method, the set of conditions is determined to be satisfied if i) the user equipment is configured to expect to receive said steering of roaming information during registration, ii) the registration type is one of said initial registration type, said mobility registration type, or said emergency registration type, and iii) steering of roaming information is already stored at said user equipment but said mobile network is determined to be located in a country that is different from a country associated with said steering of roaming information already stored at said user equipment.

In some example embodiments of the method, the set of conditions is determined to be satisfied if i) the user equipment is configured to expect to receive said steering of roaming information during registration, ii) the registration type is one of said initial registration type, said mobility registration type, or said emergency registration type, and iii) steering of roaming information is already stored at said user equipment but said mobile network is determined to be different from a previous mobile network associated with said steering of roaming information already stored at said user equipment.

In some further example embodiments, an apparatus is provided for enabling efficient update of steering of roaming information, said apparatus comprising: means, such as a network entity, a network node, an Access and Mobility Management Function (AMF), or the like, for receiving, from a user equipment, a registration request message comprising a steering of roaming information update request; means, such as a network entity, a network node, an AMF, or the like, for determining, based on at least said registration request message, whether said user equipment expects to receive steering of roaming information; and means, such as a network entity, a network node, an AMF, or the like, for, in an instance in which it is determined that said user equipment expects to receive steering of roaming information, providing said steering of roaming information to said user equipment.

In some further example embodiments, a computer program product is provided, said computer program product comprising a non-transitory computer readable medium including program code which, when executed, causes at least: receiving, from a user equipment, a registration request message comprising a steering of roaming information update request; determining, based on at least said registration request message, whether said user equipment expects to receive steering of roaming information; and in an instance in which it is determined that said user equipment expects to receive steering of roaming information, providing said steering of roaming information to said user equipment.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

BRIEF DESCRIPTION OF THE DRAWINGS

Figure 1:
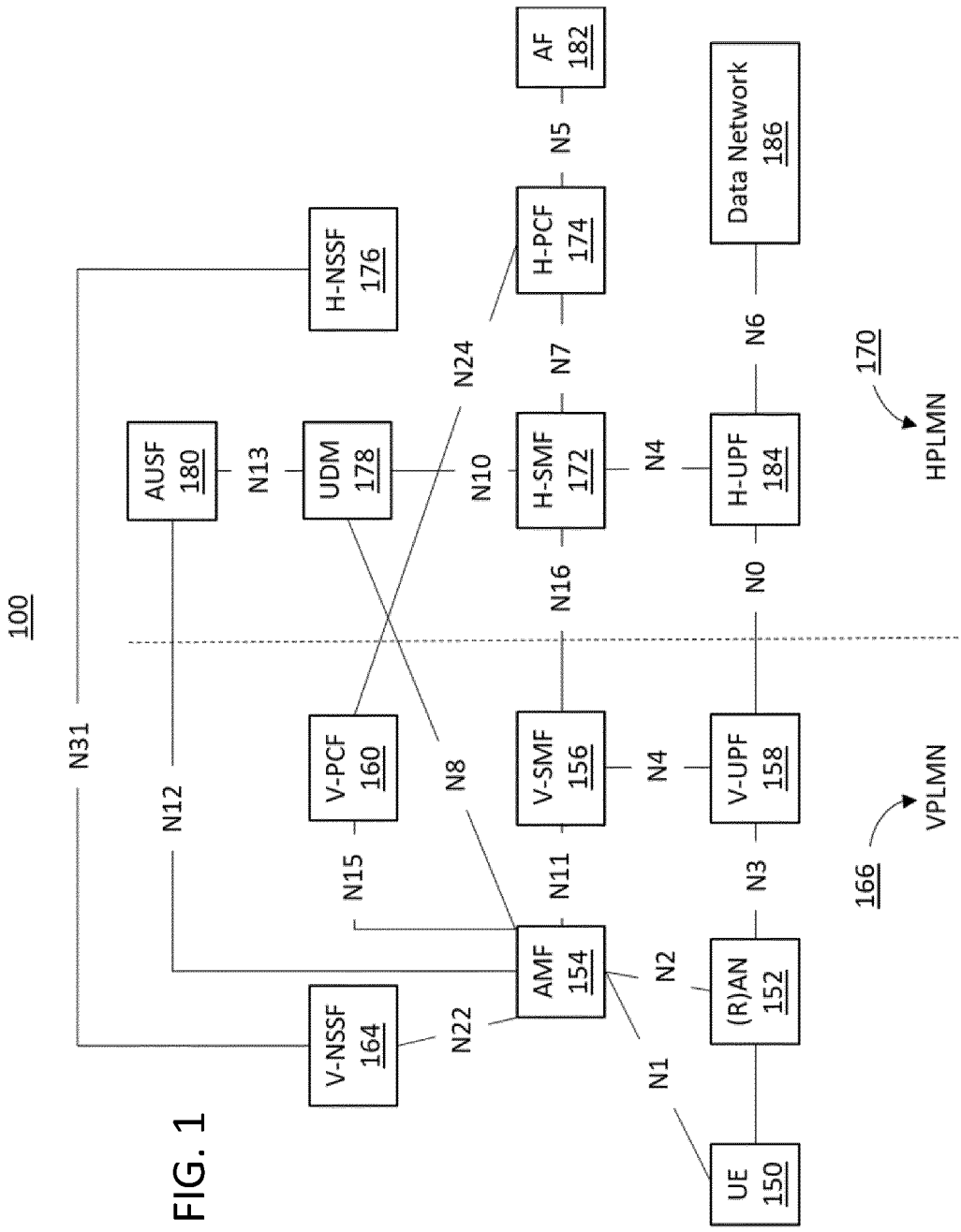
Figure 3:
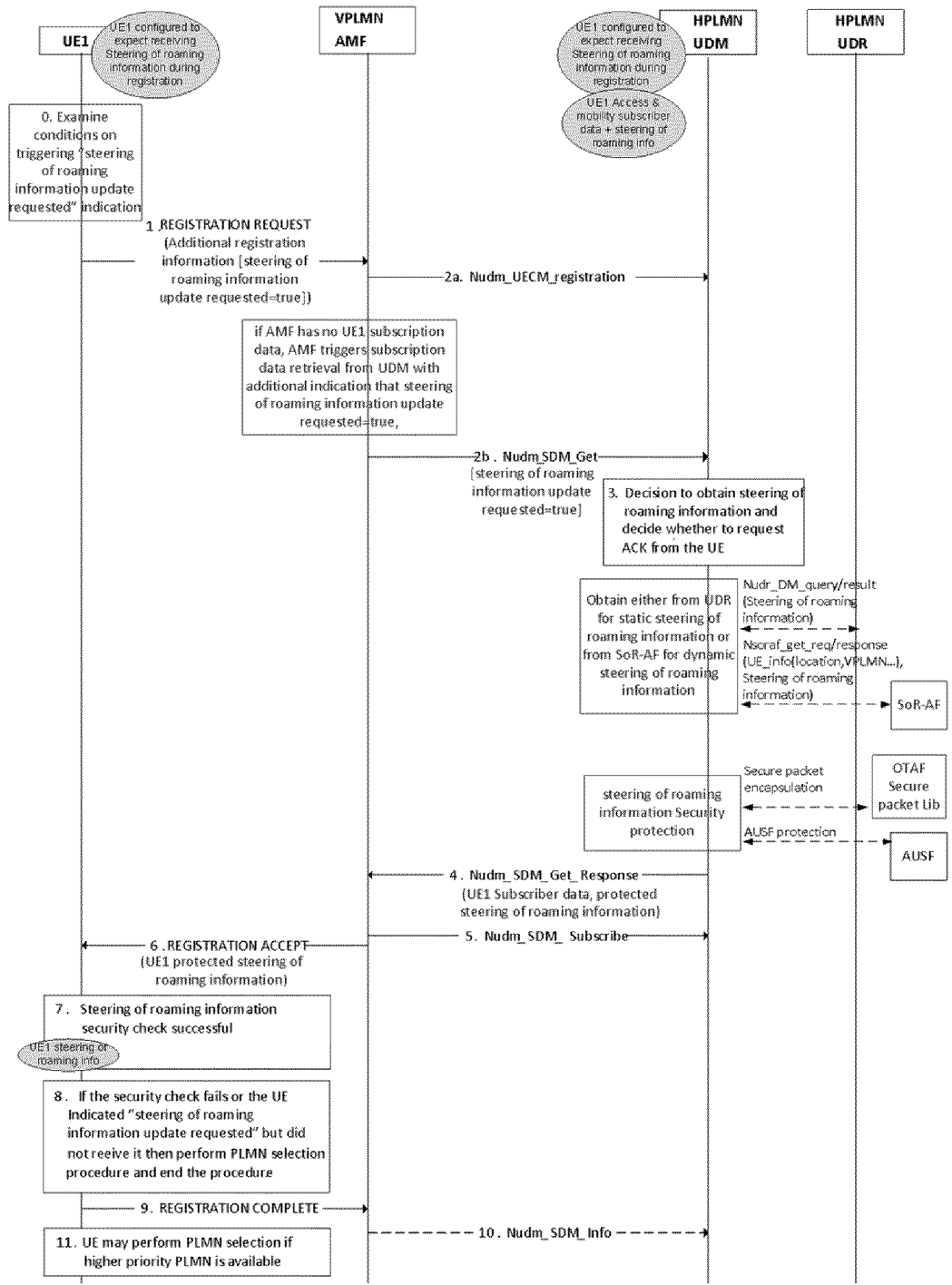
Figure 4:
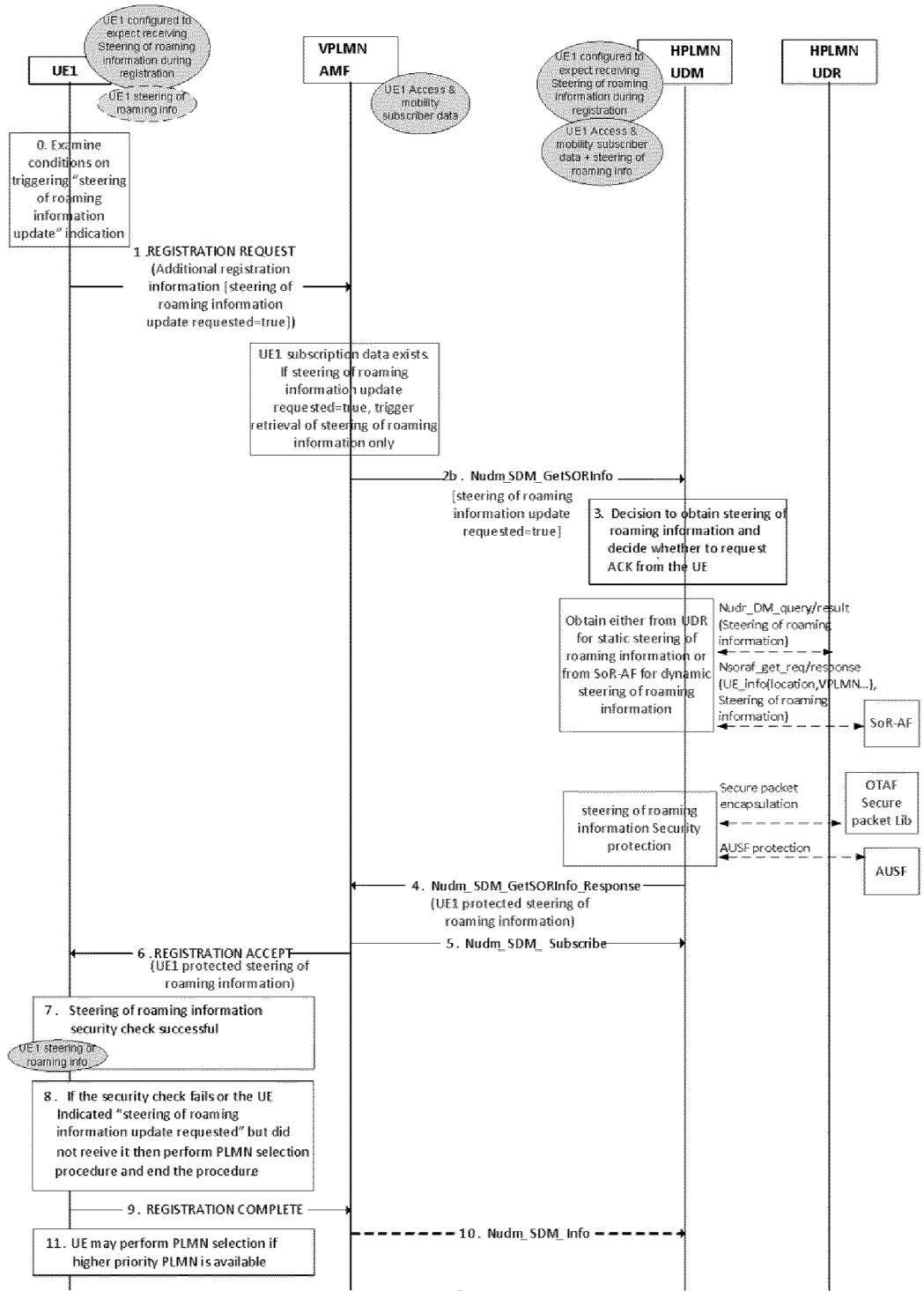
Figure 5:
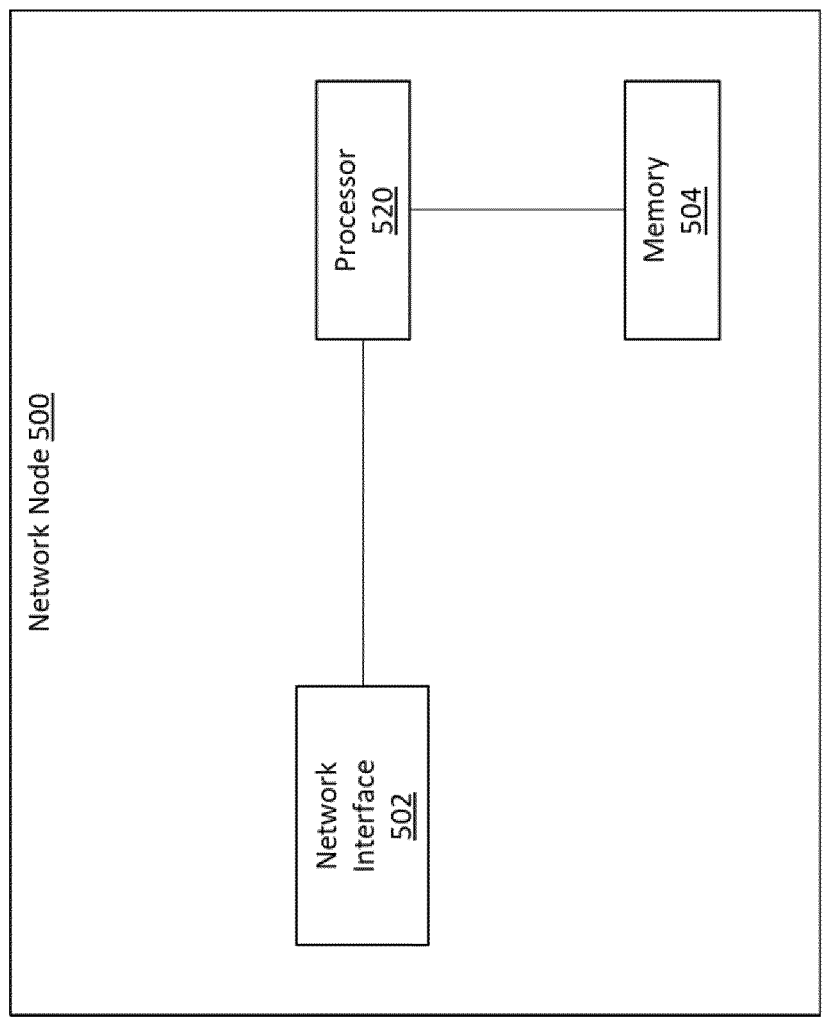
Figure 6:
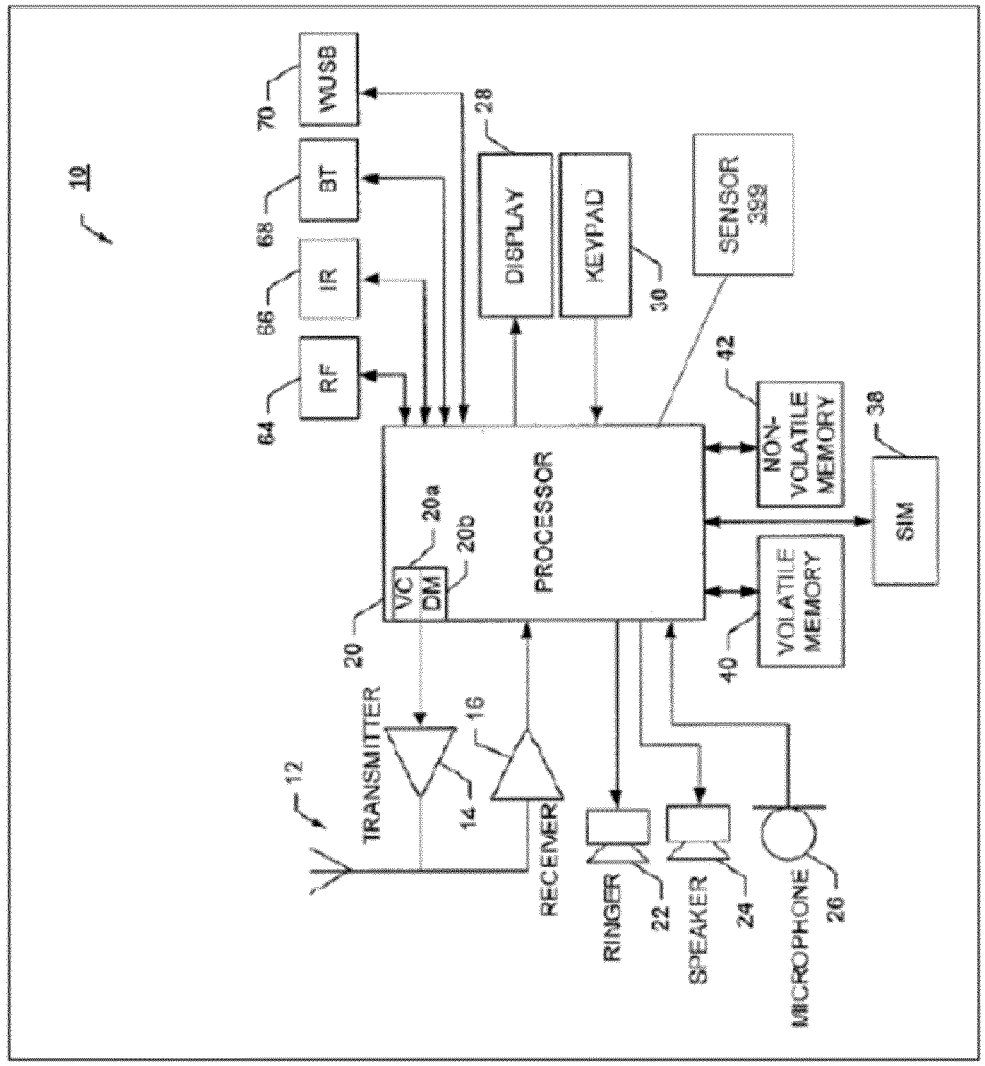
Figure 7:
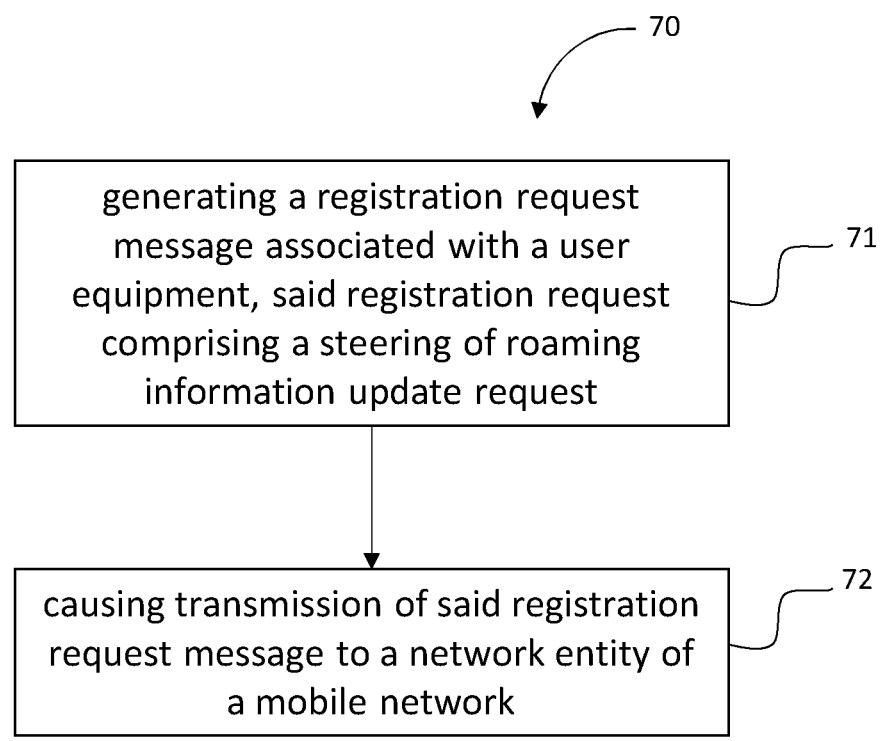
Figure 8:
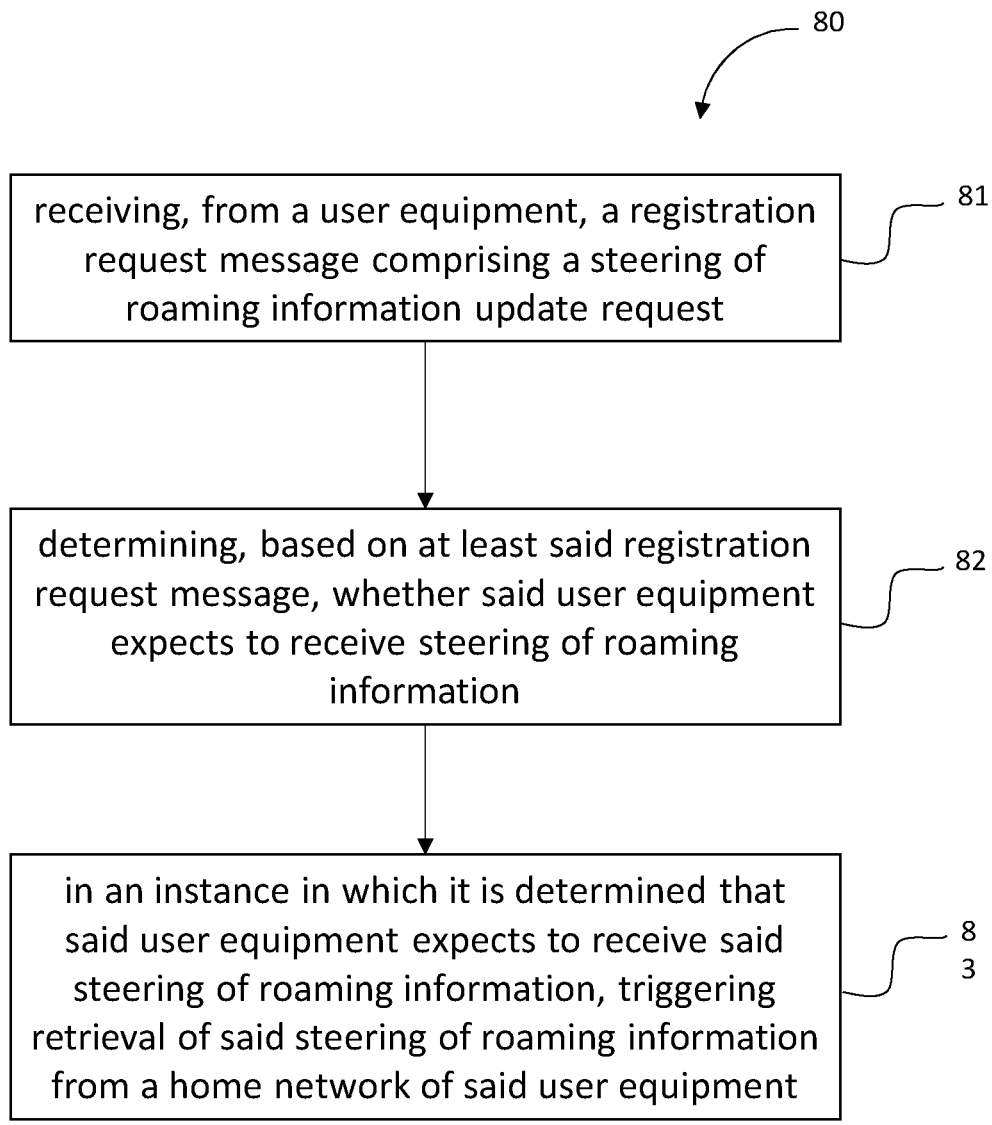

Having thus described certain example embodiments of the present disclosure in general terms, reference will hereinafter be made to the accompanying drawings, which are not necessarily drawn to scale, and wherein:

FIG. 1 depicts an example of a portion of a 5G wireless network, in accordance with some example embodiments;

FIG. 2 depicts an additional registration information IEI, in accordance with some example embodiments;

FIG. 3 depicts messaging between a user equipment and network entities, in accordance with some example embodiments;

FIG. 4 depicts messaging between a user equipment and network entities, in accordance with some example embodiments;

FIG. 5 depicts an example of a network node, in accordance with some example embodiments;

FIG. 6 depicts an example of an apparatus, in accordance with some example embodiments;

FIG. 7 depicts an example of a process flow for VPLMN configuration updating, in accordance with some example embodiments; and FIG. 8 depicts another example of a process flow for VPLMN configuration updating, in accordance with some example embodiments.

Like labels are used to refer to same or similar items in the drawings.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to one or more or all of the following: (a) hardware-only circuit implementations (such as implementations in analog circuitry and/or digital circuitry); (b) combinations of circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when needed for operation. This definition of 'circuitry' applies to all uses of this term in this application, including in any claims. As a further example, as used in this application, the term 'circuitry' also covers an implementation of merely a hardware circuit or processor (or multiple processors) or portions of a hardware circuit or processor and its (or their) accompanying software and/or firmware. The term 'circuitry' also covers, for example and if applicable to the particular claim element, a baseband integrated circuit or processor integrated circuit for a mobile phone or a similar integrated circuit in a server, a cellular network device or other computing or network device.

As defined herein, a "computer-readable storage medium," which refers to a physical storage medium (e.g., volatile or non-volatile memory device), may be differentiated from a "computer-readable transmission medium," which refers to an electromagnetic signal.

In an example mobile network system, such as, e.g., a fifth-generation (5G) system or any other suitable mobile network system, a user equipment (UE) may be roaming from a home network, e.g., a home public land mobile network (HPLMN) to a visited network, e.g., a visiting public land mobile network (VPLMN). casein such a case in which the UE is roaming to a visited network, the UE may request registration with an available VPLMN to, for example, enable access to one or more services that are available at the VPLMN. The UE may, therefore, send a request for registration to a base station or another network entity of the VPLMN, which may indicate that the UE is roaming and needs to register with an available VPLMN. Such a registration request may be an initial registration request, a mobility registration request, an emergency registration request, or the like. The UE may make such a request by indicating one or more particular VPLMNs that are preferred, with which the UE's HPLMN has a roaming agreement, for which the UE is configured to register, and/or the like. In some instances, the UE and/or the network entity (e.g., base station) may not know which VPLMN to which the UE should be registered, in which case the HPLMN may provide suggestions or control the UE's roaming behavior. For instance, the HPLMN may provide, at the UE or elsewhere, a HPLMN provided protected list of preferred PLMN/access technology combinations. The list of preferred PLMN/access technology combinations from the HPLMN, also referred to as steering of roaming information which is part of the UE's subscription data, can be provided by the UE's HPLMN to the UE via control plane NAS signaling. The HPLMN generates the steering of roaming information either based on the static configuration or dynamic policies. In some embodiments, dynamic SoR information may be derived based upon one or more of a roaming agreement, the UE's current location(s), the visiting PLMN that the UE is trying to register with, or any other suitable characteristics, configurational information, dynamic policy information, or the like. In some embodiments, in terms of the efficiency of updating SoR information for the UE, it may be helpful for the UE to provide information about the UE, such as the dynamic policy information, characteristics about the UE's location, or the like, to an Access and Mobility Management Function (AMF) of the mobile network (e.g., the VPLMN AMF). In some embodiments, in terms of the efficiency of updating SoR information for the UE, it may be helpful for the AMF (e.g., the VPLMN AMF) to provide the same or similar information to the UDM (e.g., the HPLMN UDM). In some embodiments, in terms of the efficiency of updating SoR information for the UE, it may be helpful for the UDM to provide the same or similar information to the UDR (e.g., the HPLMN UDR), the SoR-AF (e.g., the HPLMN SoR-AF), or the like.

When the steering of roaming information is sent to the UE, either when the UE is trying to register onto the VPLMN or after the UE has registered onto the VPLMN, it is often mandatory for the VPLMN to transparently forward to the UE the steering of roaming (SoR) information received from the HPLMN and to transparently forward to the HPLMN the acknowledgement of successful reception of the SoR information received at UE.

In order to prevent the VPLMN from dropping or altering the SoR information, it is specified that the HPLMN Unified Data Management (UDM) component(s) shall provide the SoR information to the UE when the UE performs initial registration in a VPLMN if the UE is pre-configured to expect receiving steering of roaming information due to initial registration in a VPLMN.

However, one or more problems typically arise based upon limitations of the existing approach. For example, under the current approach, a requirement for "initial registration in a VPLMN" means "initial registration" in terms of registration types in a non-access stratum (NAS). For the mechanism to work, the AMF (e.g., the VPLMN AMF) typically should be able to send a query to the HPLMN for the HPLMN UDM to provide the SoR information to the UE during every initial registration. However, such functionality is not supported by current subscription data update mechanisms because an AMF (e.g., the VPLMN AMF) requests subscription data only when the AMF does not have the UE's information (e.g., the UE's subscription data) available, irrespective of whether the UE has initiated "initial registration" as the registration type. If the AMF has the UE's subscription data already, then the AMF will not request subscription data from the UDM, as long as the AMF has valid subscription data. This means that the UE will not be able to receive the SoR information during this initial registration process. Consequently, under the current approach, it is not possible to provide the UE with valid SoR information from the UDM perspective for every "initial registration" from the UE in terms of registration type by NAS, even if the UE is expected to receive SoR info for every "initial registration."

Besides the issue that the current approach does not work properly because it is not possible to provide the UE with valid SoR information for every "initial registration" based on existing stage 2 and the UDM implementation, and further besides the issue that the registration would fail which would push the UE out of this VPLMN even if this VPLMN might be a higher priority VPLMN according to the SoR PLMN list provided by the HPLMN, another issue is that, under the current approach, requiring an SoR information update during every "initial registration" is not efficient.

This is at least because when the UE performs its first initial registration, the HPLMN has typically already provided the UE with the SoR information. Any subsequent changes can be provided to the UE immediately via a Downlink NAS transport approach. At any point of time, the UE would already have the most up-to-date SoR information already. In such instances, there it may be unnecessary to require the HPLMN UDM to provide the SoR information to the UE during every registration.

Another issue is that, other than initial registration, there is another case where the UE may wish to update the SoR information policy, such as during an Emergency Registration. In such instances, the AMF may need to inform the UDM whenever the AMF receives a REGISTRATION REQUEST message with the registration type of "emergency registration" and the UE is authenticated, even if the AMF already has the subscription data of the UE.

As such, the current approach for registration of UEs with a VPLMN is inefficient because there is no way for network entities to determine whether the UE already has the most up-to-date SoR information, whether the UE has already been subscribed to a preferred VPLMN and is simply re-registering, and/or that the UE needs SoR information despite the registration type being a mobility registration type or an emergency registration type.

Provided herein are some example embodiments of methods, apparatuses, and computer program products for enabling efficient updating of SoR information, for example updating of SoR information for UEs requesting registration with an available VPLMN.

FIG. 1 depicts an example of a portion of a 5G wireless network 100, in accordance with some example embodiments.

The wireless network 100 (e.g., 5G wireless network) may include a user equipment (UE) 150 configured to wirelessly couple to a radio access network (RAN) 152 being served by a wireless access point, such as a base station, wireless local area network access point, home base station, and/or other type of wireless access point.

The network 100 may include a core network, which may include an AMF 154, a visiting session management function (V-SMF) 156, a visiting policy control function (v-PCF) 160, a visiting network slice selection function (v-NSSF) 164, and/or a visiting user plane function (V-UPF) 158. In the example of FIG. 1, devices 152-164 may be associated with a visiting public land mobile network (VPLMN) 166.

The network 100 and/or the core network may include devices having functions supporting a home public land mobile network (HPLMN) 170 as well. For example, these devices in the HPLMN 170 may include devices and corresponding functions for "home" wireless local area network (WLAN) access, offloading, and/or non-3GPP access. These devices may include a home SMF 172, a home PCF 174, a home NSSF 176, unified data management 178, an authentication server function (AUSF) 180, an application function (AF) 182, a home user plane function (H-UPF) 184, and a data network (DN) 186.

FIG. 1 also depicts service interfaces, such as N1, N2, N3, N4, N6, N7, N11, N15, N18, N24, and/or the like. The architecture, nodes (including AMF, V-PCF, H-PCF, H-SMF, and V-SMF as well as other devices depicted at FIG. 1), and the service interfaces may be defined in accordance with a standard, such as 3GPP TS 23.501, although other standards as well as proprietary interfaces may be used.

A network slice refers to a logical network that provides specific network capabilities and network characteristics. The network slice may be considered a logical end-to-end network that can be dynamically created, so that a given UE may access different network slices over the same radio access network (e.g., over the same radio interface). The network slices can provide different services and/or have different QoS needs/requirements. 3GPP TS 23.501, System Architecture for the 5G System, describes examples of network slices.

According to some embodiments, an approach for enabling efficient updating of SoR information can be provided. Such approaches can comprise methods, apparatuses, systems, computer program products, and/or the like. In some embodiments, such an approach can be provided in which a new explicit "SoR info update request" indication is provided with a registration request transmitted from a UE to a network entity. Such "SoR info update request" indications can provide an explicit request for updated SoR information from a mobile network, such as a PLMN, a HPLMN, or the like.

In some embodiments, a set of conditions can be established, either by/at the UE or by/at the PLMN/HPLMN or the like. In some embodiments, the set of conditions can be used to determine whether the "SoR info update request" indication needs to be triggered during registration, such as during an initial registration, a mobility registration, and/or an emergency registration. In some embodiments, triggering the "SoR info update request" indication can refer to including the indication within a Registration Request message or otherwise communicating that SoR information should be requested or queried. The indication, such as the "SoR info update request" indication signaled in the Registration Request, may then trigger a query of a network entity for the SoR information. By way of example only, a "SoR info update request" indication in a Registration Request message sent from a UE to an AMF of a VPLMN may trigger the AMF of the VPLMN to query a network entity (e.g., a UDM, a UDR, a SoR-AF, etc.) of an HPLMN.

In some embodiments, for a UE that is configured to expect to receive the SoR information during registration, the UE may set the "SoR info update request" indication only when one or more of the triggering set of conditions associated with the registration is true or satisfied.

In some embodiments, for instance on the UE side, a UE can be configured to expect receiving the steering of roaming information during registration. Such a configuration can be affected on the UE either via UE configuration parameters in the USIM or ME, or otherwise.

In some embodiments, whether the AMF requests SoR information from the UDM during UE registration may be determined by this explicit "SoR info update request" indication in the registration request message. If the indication in the registration request message indicates "SoR info update requested," the AMF would then request SoR information from the UDM, either as part of a regular subscription data retrieval process or via a dedicated special UDM operation to obtain just the SoR information. In some embodiments, an approach for SoR information update when the AMF has no subscription data during registration is provided. In some embodiments, an approach for SoR information update when subscription data exists during registration is also provided.

Among other benefits, a benefit of at least some of the disclosed approaches is that they typically resolve the issue in which the UE fails an initial registration when the AMF already has the UE's subscription data and the UDM is not queried for UE subscription data retrieval. Furthermore, these approaches also maintain the security features of the current approaches as the UE is still able to receive SoR information securely (and the VPLMN delivers this SoR information as requested).

Another benefit of at least some of the disclosed approaches is that they solve the issue related to receiving SoR information during emergency registration of the UE with a mobile network. For example, the SOR information is provided, according to some embodiments, to the UE during emergency registration because the UE provides an explicit indication in the associated registration request for the AMF/UDM to request updated SoR information during emergency registration.

Furthermore, the disclosed approaches for updating SoR information are more efficient because SoR information is only requested in an instance in which the registration request indicates SoR information should be requested and/ or when the set of conditions are satisfied. The disclosed approaches also work with existing AMF and UDM update procedures and the AMF does not need to request an SoR update for every single initial registration where the AMF already has subscription data.

In some embodiments, for a UE that is configured to expect to receive the SoR information during initial registration in a VPLMN, if the UE is switched (e.g., powered) off and then on again after the UE has been successfully registered to a preferred VPLMN, the UE will still be registered to the same AMF in the same VPLMN, however the AMF will not request subscription data from the UDM nor request to retrieve SoR information from the UDM. Therefore, no SoR information will be sent to the UE from the network in this case.

In this case, since the UE is configured to expect to receive SoR information upon initial registration in a VPLMN, the UE registration would fail. The UE would release NAS signaling connection and go through PLMN selection to obtain service on a higher priority PLMN even though, in this case, the current VPLMN that the UE is trying to register on is a higher priority, preferred PLMN.

FIG. 2 depicts an example of an Additional Registration Information information element (IEI) that provides an explicit "SoR info update request" indication. The Additional Registration Information IEI can be used along with the UE's registration request message. At least one purpose of the Additional Registration Information IEI is to provide additional information about the registration procedure. In some embodiments, the Additional Registration Information IEI may be coded as shown in FIG. 2. In some embodiments, the Additional Registration Information IEI may be coded as shown in Table 1.

TABLE 1

An example Additional Registration Information IEI Steering of roaming information update request value (SIUR) (bit 1 of octet 1)

| Bit | |
|---|---|
| 1 | |
| 0 | Steering of roaming information update not requested. |
| 1 | Steering of roaming information update requested |

Bits 2-4 are spare and shall be coded as zero,

In some embodiments, the "SoR info update request" indication may be included into a REGISTRATION REQUEST message. In some embodiments, the REGISTRATION REQUEST message may then be sent from the UE to the AMF. In some embodiments, the request may be a "REGISTRATION REQUEST," the significance can be "dual," and the direction can be "UE to network." An example of a REGISTRATION REQUEST comprising an additional "SoR info update request" indication is provided in Table 2.

TABLE 2

Example of a REGISTRATION REQUEST with additional SoR indication

| IEI | Information Element | Type/Reference | Presence | Format | Length |
|---|---|---|---|---|---|
| | Extended protocol discriminator | Extended Protocol discriminator 9.2 | M | V | 1 |
| | Security header type | Security header type 9.3 | M | V | ½ |
| | Spare half octet | Spare half octet 9.5 | M | V | ½ |
| | Registration request message identity | Message type 9.7 | M | V | 1 |
| | 5GS registration type | 5GS registration type 9.11.3.7 | M | V | ½ |
| | ngKSI | NAS key set identifier 9.11.3.32 | M | V | ½ |
| | 5GS mobile identity | 5GS mobile identity 9.11.3.4 | M | LV-E | 6-n |
| | . . . | | | | |
| xx | Additional registration information | Additional registration information 9.11.3.xx | O | TV | 1 |

In some embodiments, the Additional Registration Information IEI may be included in the REGISTRATION REQUEST message if the UE is configured to expect the SoR information during registration and one or more conditions for setting the "SoR info update request" indication during registration is/are satisfied.

In some embodiments, a set of conditions can be used to determine whether the "SoR info update request" indication needs to be included during registration of the UE. For example, if the UE is configured to expect receiving the steering of roaming information during registration, the UE shall set the "SoR information update request" indication to "Steering of roaming information update requested" if condition a), condition b), condition c), or condition d) is evaluated and determined to be true:

Condition a):
  UE is configured to expect receiving of steering of roaming information during registration; and
  UE is performing initial registration with registration type set to "initial registration"; and
  UE does not have steering of roaming information stored in the USIM or ME.

Condition b):
  UE is configured to expect receiving of steering of roaming information during registration; and
  UE is performing emergency registration with registration type set to "emergency registration"; and
  UE does not have steering of roaming information stored in the USIM or ME.

Condition c):
  UE is configured to expect receiving of steering of roaming information during registration; and
  UE is performing initial registration or mobility registration or emergency registration with registration type set to "initial registration", or "mobility registration", or "emergency registration"; and
  UE has steering of roaming information in the USIM or ME, however the UE is registering in a VPLMN of a new country that is different from the country of the previous VPLMN from which the steering of roaming information was received.

Condition d):
  UE is configured to expect receiving of steering of roaming information during registration; and
  UE is performing initial registration or mobility registration or emergency registration with registration type set to "initial registration", or "mobility registration", or "emergency registration"; and
  UE has steering of roaming information in the USIM or ME, however the UE is registering in a new VPLMN and the UE decides to obtain the dynamic steering of roaming information.

Also provided herein are procedures and approaches for updating SoR information when the AMF has no subscription data during registration. For example, messaging between the UE, VPLMN, and HPLMN can be carried out to enable efficient updating of SoR information. As illustrated, the UE may initially examine whether and/or determine that conditions for triggering or setting the "steering of roaming information update" indication. In an instance in which the UE determines that the conditions are satisfied, the UE may provide a REGISTRATION REQUEST message, including the additional registration information (steering of roaming information update request="true") indication, to the VPLMN AMF. In such an instance, after Nudm_UECM_registration message exchanges, the VPLMN AMF may invoke a service operation to send a Nudm_SDM_Get message to the HPLMN UDM requesting the subscription data and including an indication that an SoR information update has been requested.

The HPLMN UDM may be configured to determine from the Nudm_SDM_Get message that the UE is configured to expect to receive SoR information during registration and that UE subscription information needs to be retrieved. In some embodiments, the HPLMN UDM may also be configured to decide whether to request acknowledgement of the SoR information update request from the UE. For instance, if the VPLMN is not trustworthy or there is an indication that the VPLMN or a network entity thereof has been spoofed, the HPLMN UDM may require independent confirmation from the UE that the UE is requesting updated SoR information as part of an authentic and intentional REGISTRATION REQUEST and/or may confirm the VPLMN information with the VPLMN via a further authentication message therebetween.

Also provided herein are procedures and approaches for updating SoR information when the AMF has subscription data during registration. For example, messaging between the UE, VPLMN, and HPLMN can be carried out to enable efficient updating of SoR information. As illustrated and described, the UE may initially examine whether and/or determine that conditions for triggering retrieval of SoR information and/or setting the "steering of roaming information update" indication. In an instance in which the UE determines that the conditions are satisfied, the UE may provide a REGISTRATION REQUEST message, including the additional registration information (steering of roaming information update request="true") indication, to the VPLMN AMF. If the VPLMN AMF has UE subscription data, the AMF may determine that only a query of the UDM for the SoR information update is required. In such an instance, the VPLMN AMF may invoke a service operation to send a Nudm_SDM_GetSORInfo message to the HPLMN UDM that includes an indication that an SoR information update has been requested.

The HPLMN UDM may be configured to determine from the Nudm_SDM_GetSORInfo message that the UE is configured to expect to receive SoR information during registration and that UE subscription information does not need to be retrieved. In some embodiments, the HPLMN UDM may also be configured to decide whether to request acknowledgement of the SoR information update request from the UE. For instance, if the VPLMN is not trustworthy or there is an indication that the VPLMN or a network entity thereof has been spoofed, the HPLMN UDM may require independent confirmation from the UE that the UE is requesting updated SoR information as part of an authentic and intentional REGISTRATION REQUEST and/or may confirm the VPLMN information with the VPLMN via a further authentication message therebetween.

Once the HPLMN UDM is satisfied that the query is a query for SoR information and, in certain instances, a query also for UE subscription data, the HPLMN UDM may retrieve the UE Access & Mobility Subscriber data and updated SoR information associated with the UE. In some embodiments, to do so, the HPLMN UDM may send a retrieval message, such as a Nudr_DM query message or a Nsoraf_get_request, to the HPLMN Unified Data Repository (UDR), a Steering of Roaming Application Function (SoR-AF), or the like. The Nsoraf_get_request message may comprise a request for SoR information and may also comprise UE_info such as the location of the UE, the particular PLMN (e.g., VPLMN) with which the UE is trying to register, roaming agreements, and any other characteristic or configurational information related to the UE, and/or dynamic SoR policy information. In some embodiments, static SoR information may be obtained from the HPLMN UDR while dynamic SoR information may be obtained from the SoR-AF. The HPLMN UDR or SoR-AF may then respond to the HPLMN UDM with a response message providing the static or dynamic SoR information. The HPLMN UDM may then carry out a SoR information security/protection procedure by sending a secure packet encapsulation message to an over-the-air activation function (OTAF) secure packet library or an AUSF protection message to an Authentication Server Function (AUSF), the response to which can be used to protect the SoR information prior to the HPLMN UDM responding to the VPLMN AMF.

Based on whether the HPLMN UDM receives secure packet encapsulation from the OTAF secure packet library or AUSF protection from the AUSF, the HPLMN UDM can then protect the SoR information and include the protected SoR information in a Nudm_SDM_Get_Response message to the VPLMN AMF. In response, the VPLMN AMF can then return a Nudm_SDM_Subscribe message to the HPLMN UDM indicating that the VPLMN has accepted the REGISTRATION REQUEST from the UE. The VPLMN AMF then sends a REGISTRATION ACCEPT message to the UE including the protected SoR information.

Upon receiving the protected SoR information from the VPLMN AMF, the UE then does a security check to determine if the SoR information is suitable and properly protected, and stores the SoR information at the UE, for instance at a universal subscriber identification module (USIM), universal integrated circuit card, local memory of the user equipment, and/or the like. In an instance in which the security check fails or the UE indicated "SoR information updated requested" in the REGISTRATION REQUEST but did not receive updated SoR information, the UE may then initiate a PLMN selection procedure and end the SoR update procedure in favour of starting a new procedure for selecting among available PLMNs. In an instance in which the security check is successful and the UE received the updated SoR information, if the UE was configured to expect updated SoR information upon registration, then the UE may send a REGISTRATION COMPLETE message back to the VPLMN AMF, the VPLMN AMF can send a Nudm_SDM_Info message to the HPLMN UDM, and the UE may perform PLMN selection if a higher priority PLMN is available.

FIG. 3 illustrates an example embodiment of a procedure for the UE to obtain SoR information from the HPLMN during registration. As illustrated, at element 0, for a UE that is configured to expect receiving the steering of roaming information during registration (the configuration can be made as an USIM parameters, or as UE or mobile equipment (ME) configuration parameters), the UE assesses whether explicit steering of roaming information update request indication needs to be triggered during registration based on a set of conditions, such as the set of conditions specified above.

As illustrated at element 1, if the condition for setting "steering of roaming information update request" indication during registration is satisfied in element 0, steering of roaming information update is needed. In some embodiments, the UE can include a "steering of roaming information update requested" indication in an information element of the REGISTRATION REQUEST message to request steering of roaming information update from the HPLMN UDM.

As illustrated at element 2, once the AMF receives this explicit "steering of roaming information update requested" indication, the AMF then queries the UDM to retrieve SoR information. If the AMF has no UE subscription data, then steering of roaming information can be part of the subscription data retrieval. The AMF invokes UDM subscription data retrieval operation Nudm_SDM_Get to retrieve the UE subscription data and the SoR information. The AMF also includes "steering of roaming information update requested" indication in the Nudm_SDM_Get message to HPLMN UDM.

As illustrated at element 3, the UDM then decides whether to use static steering of roaming information stored in UDM or to use the dynamically generated steering of roaming information from the SOR-AF application function based on a HPLMN operator policy.

The HPLMN UDM then protects the steering of roaming information from the list of preferred PLMN/access technology combinations obtained. For a steering of roaming information update to the USIM, the information is additionally encapsulated in secured packet format via the API to secured packet library in the OTAF network function.

If the HPLMN UDM is not able to obtain the list of preferred PLMN/access technology combinations from either static configuration or from dynamic steering of roaming information retrieval from the SOR-AF application function, then the HPLMN UDM forms the steering of roaming information as 'no list of preferred PLMN/access technology combinations is provided'.

As illustrated at element 4, the HPLMN UDM then sends the subscription data and security protected steering of roaming information to the VPLMN AMF. The HPLMN may also include a request for the UE to acknowledge the successful security check of the received steering of roaming information.

As illustrated at element 5, the AMF may also request to subscribe to UDM notification of changes of the subscription data received in element 4) including notification of updates of the steering of roaming information included in the Access and Mobility Subscription data.

As illustrated at element 6, the AMF then transparently sends the received steering of roaming information to the UE in the REGISTRATION ACCEPT message.

As illustrated at element 7, if an "SoR info update requested" indication was included in the REGISTRATION REQUEST message, and the steering of roaming information is received in the REGISTRATION ACCEPT message and the security check is successful, the steering of information on the ME or USIM is updated. For the USIM update, the steering of roaming information is uploaded to the USIM for a further secured packet related procedure. If the UDM has not requested an acknowledgement from the UE, the UE sends the REGISTRATION COMPLETE message without including an SOR transparent container.

As illustrated at element 8, if an "SoR info update requested" indication was included in the REGISTRATION REQUEST message and either i) the steering of roaming information is received in the REGISTRATION ACCEPT message and the security check of the received steering of roaming information has failed; or ii) no SoR information is received in the REGISTRATION ACCEPT message and no indication is received indicating 'no change of the "Operator Controlled PLMN Selector with Access Technology" list stored in the UE is needed and thus no list of preferred PLMN/access technology combinations is provided', then the UE sends the REGISTRATION COMPLETE message to the serving AMF (e.g., the AMF that sent the REGISTRA- TION ACCEPT message) without including an SoR transparent container, releases the current N1 NAS signalling connection locally, stores the PLMN identity (e.g., the identity of the PLMN associated with the serving AMF) in the list of "PLMNs where registration was aborted due to SoR", and attempts to obtain service on a higher priority PLMN. If the UE has an established emergency PDU session, the UE releases the current N1 NAS signalling connection locally after the release of the emergency PDU session.

As illustrated at elements 9-11, after element 7, the UE performs steering of roaming and potentially PLMN selection based on the steering of roaming information received. If the UDM has requested an acknowledgement from the UE, the UE sends an acknowledgement in the REGISTRATION COMPLETE message to the serving AMF. The UDM verifies that the acknowledgement is provided by the UE.

FIG. 4 illustrates an example embodiment of a procedure for the UE to obtain SoR information from the HPLMN during registration in an instance when subscription data is determined to already exist (e.g., at the AMF) during registration. As illustrated at element 0, for a UE that is configured to expect receiving the SoR information during registration (the configuration change indicating an expectation to receive SoR information during registration can be made via changes to USIM configuration parameters or ME configuration parameters), the UE assesses whether explicit steering of roaming information update request indication needs to be triggered during registration based on the set of conditions specified in subclause 2) above.

As illustrated at element 1, if a condition for setting "steering of roaming information update request" indication during registration is satisfied in element 0, steering of roaming information update is needed. In such an instance, the UE includes "steering of roaming information update requested" indication in an information element of the REGISTRATION REQUEST message to request steering of roaming information update from the HPLMN UDM.

As illustrated at element 2, once the AMF receives the REGISTRATION REQUEST including this explicit "steering of roaming information update requested" indication, the AMF would then query the UDM to retrieve SoR information. If the AMF already has UE subscription data, the AMF invokes dedicated UDM SoR retrieval operations using a Nudm_SDM_GetSoRInfo message to query and retrieve just the SoR information and not UE subscription data. The AMF also includes the "steering of roaming information update requested" indication in the Nudm_GetSoRInfo message to the HPLMN UDM.

As illustrated at element 3, the UDM then decides whether to use static steering of roaming information stored in UDM or to use the dynamically generated steering of roaming information from the SOR-AF application function based on a HPLMN operator policy.

The HPLMN UDM then protects the steering of roaming information from the list of preferred PLMN/access technology combinations obtained. For a steering of roaming information update to USIM, the information is additionally encapsulated in secured packet format via an API to secured packet library in an OTAF network function.

If the HPLMN UDM is not able to obtain the list of preferred PLMN/access technology combinations from either static configuration or from dynamic steering of roaming information retrieval from the SOR-AF application function, then the HPLMN UDM forms the steering of roaming information as 'no list of preferred PLMN/access technology combinations is provided'.

As illustrated at element 4, the HPLMN UDM then returns security protected steering of roaming information to the VPLMN AMF using a dedicated UDM operation, e.g., by a Nudm_SDM_GetSoRInfo_response operation which responds to the AMFs Nudm_SDM_GetSoRInfo message. The HPLMN may also include a request for the UE to acknowledge the successful security check of the received steering of roaming information.

As illustrated at element 5, the AMF may also request to subscribe to UDM notification of changes of the subscription data received in element 4, including notification of updates of the steering of roaming information included in the Access and Mobility Subscription data.

As illustrated at element 6, the AMF then transparently sends the received steering of roaming information to the UE in the REGISTRATION ACCEPT message.

As illustrated at element 7, if the "SoR info update requested" indication was included in the REGISTRATION REQUEST message, and if the SoR information is received in the REGISTRATION ACCEPT message and if the security check is successful, then the SoR information on the ME or USIM is updated. For a USIM update, the SoR information is uploaded to the USIM for a further secured packet related procedure. If the UDM has not requested an acknowledgement from the UE, the UE sends the REGISTRATION COMPLETE message without including an SoR transparent container.

As illustrated at element 8, if the "SoR info update requested" indication was included in the REGISTRATION REQUEST message and either i) the steering of roaming information is received in the REGISTRATION ACCEPT message and the security check of the received steering of roaming information has failed; or ii) SoR information is not received in the REGISTRATION ACCEPT message and an indication is not received that 'no change of the "Operator Controlled PLMN Selector with Access Technology" list stored in the UE is needed and thus no list of preferred PLMN/access technology combinations is provided', then the UE sends the REGISTRATION COMPLETE message to the serving AMF without including an SoR transparent container, releases the current N1 NAS signalling connection locally, stores the PLMN identity in the list of "PLMNs where registration was aborted due to SOR" and attempts to obtain service on a higher priority PLMN. If the UE has an established emergency PDU session, the UE releases the current N1 NAS signalling connection locally after the release of the emergency PDU session.

As illustrated at elements 9-11, after element 7, the UE performs steering of roaming and potentially PLMN selection based on the steering of roaming information received. If the UDM has requested an acknowledgement from the UE, the UE sends an acknowledgement in the REGISTRATION COMPLETE message to the serving AMF. The UDM verifies that the acknowledgement is provided by the UE.

The various approaches, methods, processes, procedures, messaging, and UE registration protocols, described herein, can be carried out by or using any suitable computing device. For example, at the network side, a network node may be provided for carrying out at least some of these procedures or processes. As a further example, at the UE side, the UE may be or comprise an apparatus, such as a mobile computing device or the like. Examples of such network nodes and apparatuses, described hereinbelow, can carry out the various approaches, methods, processes, procedures, messaging, and UE registration protocols described herein.

FIG. 5 depicts a block diagram of a network node 500, in accordance with some example embodiments. The network node 500 may be configured to provide one or more network side operations as described with respect to FIGS. 3 and/or 4, for example. Moreover, a mobile wireless network may have a plurality of the network nodes 500 as well. For example, the network node may be incorporated into one or more of the devices 152-180, described above with regard to FIG. 1.

The network node 500 may include a network interface 502, a processor 520, and a memory 504, in accordance with some example embodiments. The network interface 502 may include wired and/or wireless transceivers to enable access other nodes including base stations, devices 152-180, the Internet, and/or other nodes. The memory 504 may comprise volatile and/or non-volatile memory including program code, which when executed by at least one processor 520 provides, among other things, the processes disclosed herein including process 300, process 400, and/or the like.

FIG. 6 illustrates a block diagram of an apparatus 10, in accordance with some example embodiments. In some embodiments, the apparatus 10 may represent a user equipment, such as the user equipment 150. The apparatus 10, or portions therein, may be implemented in other network nodes including base stations/WLAN access points as well as the other network nodes (e.g., devices 152-184).

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signalling via electrical leads or wirelessly to the transmitter and receiver. Likewise, processor 20 may be configured to control other elements of apparatus 10 by effecting control signalling via electrical leads or wirelessly connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signalling information in accordance with an air interface standard of an applicable cellular system, and/or any number of different wireline or wireless networking techniques, comprising but not limited to Wi-Fi, WLAN techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a universal integrated circuit card (UICC), an electronic UICC (eUICC), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the base stations/WLAN access points and network nodes including the UEs (see, e.g., method 70 and/or 80).

FIG. 7 depicts a method 70 for enabling efficient updating of SoR information. The method comprises generating a registration request message associated with a user equipment, said registration request message comprising a steering of roaming information update request, at 71. Said generating 71 can be carried out using any suitable apparatus comprising means, e.g., an apparatus comprising one or more processors and one or more memories, the apparatus 10, a mobile telephone, or the like, for generating the registration request message. The method further comprises causing transmission of said registration request message to a network entity of a mobile network, at 72. Said causing transmission 71 can be carried out using any suitable apparatus comprising means, e.g., an apparatus comprising one or more processors and one or more memories, the apparatus 10, a mobile telephone, a computing device comprising a receiver-transponder or another suitable communications device, or the like, for causing transmission of said registration request message.

In some example embodiments of the method, the registration request message further comprises an indication that a set of conditions has been satisfied, said indication operable for said network entity to determine whether to return steering of roaming information to said user equipment in response to receiving said registration request message.

In some example embodiments of the method, the registration request message comprises an indication of a registration type, said registration type selected from among an initial registration type, a mobility registration type, or an emergency registration type.

In some example embodiments of the method, the set of conditions is determined to be satisfied if i) the user equipment is configured to expect to receive said steering of roaming information during registration, ii) the registration type is said initial registration type, and iii) said steering of roaming information is not already stored at said user equipment.

In some example embodiments of the method, the set of conditions is determined to be satisfied if i) the user equipment is configured to expect to receive said steering of roaming information during registration, ii) the registration type is said emergency registration type, and iii) said steering of roaming information is not already stored at said user equipment.

In some example embodiments of the method, the set of conditions is determined to be satisfied if i) the user equipment is configured to expect to receive said steering of roaming information during registration, ii) the registration type is one of said initial registration type, said mobility registration type, or said emergency registration type, and iii) steering of roaming information is already stored at said user equipment but said mobile network is determined to be located in a country that is different from a country associated with said steering of roaming information already stored at said user equipment.

In some example embodiments of the method, the set of conditions is determined to be satisfied if i) the user equipment is configured to expect to receive said steering of roaming information during registration, ii) the registration type is one of said initial registration type, said mobility registration type, or said emergency registration type, and iii) steering of roaming information is already stored at said user equipment but said mobile network is determined to be different from a previous mobile network associated with said steering of roaming information already stored at said user equipment.

FIG. 8 depicts a method 80 for enabling efficient updating of SoR information. The method 80 comprises receiving, from a user equipment, a registration request message comprising a steering of roaming information update request, at 81. Said receiving 81 can be carried out using any suitable apparatus comprising means, e.g., an apparatus comprising one or more processors and one or more memories, the network node 500, an AMF, a network entity comprising a wireless receiver, or the like, for receiving, from the user equipment, the registration request message. The method 80 further comprises determining, based on at least said registration request message, whether said user equipment expects to receive steering of roaming information, at 82. Said determining 82 can be carried out using any suitable apparatus comprising means, e.g., an apparatus comprising one or more processors and one or more memories, the network node 500, an AMF, an network entity comprising a wireless receiver, or the like, for determining whether said user equipment expects to receive steering of roaming information. The method 80 further comprises, in an instance in which it is determined that said user equipment expects to receive said steering of roaming information, triggering retrieval of said steering of roaming information from a home network of said user equipment, at 83. Said triggering retrieval 83 can be carried out using any suitable apparatus comprising means, e.g., an apparatus comprising one or more processors and one or more memories, the network node 500, an AMF, an network entity comprising a wireless receiver, or the like, for triggering retrieval of said steering of roaming information from the home network of said user equipment.

In some example embodiments of the method, the registration request message further comprises an indication that a set of conditions has been satisfied, said indication operable for determining whether to provide said steering of roaming information to said user equipment in response to receiving said registration request message.

In some example embodiments of the method, the registration request message comprises an indication of a registration type, said registration type selected from among an initial registration type, a mobility registration type, or an emergency registration type.

In some example embodiments of the method, the set of conditions is determined to be satisfied if i) the user equipment is configured to expect to receive said steering of roaming information during registration, ii) the registration type is said initial registration type, and iii) said steering of roaming information is not already stored at said user equipment.

In some example embodiments of the method, the set of conditions is determined to be satisfied if i) the user equipment is configured to expect to receive said steering of roaming information during registration, ii) the registration type is said emergency registration type, and iii) said steering of roaming information is not already stored at said user equipment.

In some example embodiments of the method, the set of conditions is determined to be satisfied if i) the user equipment is configured to expect to receive said steering of roaming information during registration, ii) the registration type is one of said initial registration type, said mobility registration type, or said emergency registration type, and iii) steering of roaming information is already stored at said user equipment but said mobile network is determined to be different from a previous mobile network associated with said steering of roaming information already stored at said user equipment.

In some example embodiments of the method, the set of conditions is determined to be satisfied if i) the user equipment is configured to expect to receive said steering of roaming information during registration, ii) the registration type is one of said initial registration type, said mobility registration type, or said emergency registration type, and iii) steering of roaming information is already stored at said user equipment but said mobile network is determined to be located in a country that is different from a country associated with said steering of roaming information already stored at said user equipment.

Various embodiments contemplated and described in this specification are also reflected in the below claims. For instance, in some example embodiments, an apparatus (e.g., apparatus 10) may be provided, said apparatus including at least one processor and at least one memory including computer program code, the at least one memory and the computer program code configured to, with the at least one processor, cause the apparatus to at least: generate a registration request message comprising a steering of roaming information update request; and cause transmission of said registration request message to a network entity of a mobile network.

In some embodiments of the apparatus, the registration request message further comprises an indication that a set of conditions has been satisfied, said indication operable for said network entity to determine whether to return steering of roaming information to said apparatus in response to receiving said registration request message.

In some example embodiments of the apparatus, the registration request message comprises an indication of a registration type, said registration type selected from among an initial registration type, a mobility registration type, or an emergency registration type.

In some example embodiments of the apparatus, the set of conditions is determined to be satisfied if i) the apparatus is configured to expect to receive said steering of roaming information during registration, ii) the registration type is said initial registration type, and iii) said steering of roaming information is not already stored at said apparatus.

In some example embodiments of the apparatus, the set of conditions is determined to be satisfied if i) the apparatus is configured to expect to receive said steering of roaming information during registration, ii) the registration type is said emergency registration type, and iii) said steering of roaming information is not already stored at said apparatus.

In some example embodiments of the apparatus, the set of conditions is determined to be satisfied if i) the apparatus is configured to expect to receive said steering of roaming information during registration, ii) the registration type is one of said initial registration type, said mobility registration type, or said emergency registration type, and iii) steering of roaming information is already stored at said apparatus but said mobile network is determined to be located in a country that is different from a country associated with said steering of roaming information already stored at said apparatus.

In some example embodiments of the apparatus, the set of conditions is determined to be satisfied if i) the apparatus is configured to expect to receive said steering of roaming information during registration, ii) the registration type is one of said initial registration type, said mobility registration type, or said emergency registration type, and iii) steering of roaming information is already stored at said apparatus but said mobile network is determined to be different from a previous mobile network associated with said steering of roaming information already stored at said apparatus.

In other example embodiments, a method may be carried out to enable efficient update of steering of roaming information. In some embodiments, the method can be carried out, at least in part, by an apparatus (e.g., apparatus 10). In some example embodiments of the method, the method can comprise: generating a registration request message associated with a user equipment, said registration request comprising a steering of roaming information update request; and causing transmission of said registration request message to a network entity of a mobile network.

In yet other example embodiments, an apparatus (e.g., apparatus 10) is provided, said apparatus comprising: means for generating a registration request message associated with a user equipment, said registration request comprising a steering of roaming information update request; and means for causing transmission of said registration request message to a network entity of a mobile network.

In still other example embodiments, a computer program product is provided, said computer program product comprising a non-transitory computer readable medium including program code which, when executed, causes at least: generating a registration request message associated with a user equipment, said registration request comprising a steering of roaming information update request; and causing transmission of said registration request message to a network entity of a mobile network. Said computer program product may be stored by or on an apparatus (e.g., apparatus 10) or a component thereof. Said computer code can be executed by an apparatus (e.g., apparatus 10).

In further example embodiments, an apparatus (e.g., network node 500) is provided, said apparatus including at least one processor and at least one memory including computer program code, the at least one memory and the computer program code configured to, with the at least one processor, cause the apparatus to at least: receive, from a user equipment (e.g., apparatus 10), a registration request message comprising a steering of roaming information update request; determine, based on at least said registration request message, whether said user equipment expects to receive steering of roaming information; and, in an instance in which it is determined that said user equipment expects to receive steering of roaming information, provide said steering of roaming information to said user equipment.

In some example embodiments of the apparatus, the registration request message further comprises an indication that a set of conditions has been satisfied, said indication operable for said apparatus to determine whether to send said steering of roaming information to said user equipment in response to receiving said registration request message.

In some example embodiments of the apparatus, the registration request message comprises an indication of a registration type, said registration type selected from among an initial registration type, a mobility registration type, or an emergency registration type.

In some example embodiments of the apparatus, the set of conditions is determined to be satisfied if i) the user equipment is configured to expect to receive said steering of roaming information during registration, ii) the registration type is said initial registration type, and iii) said steering of roaming information is not already stored at said user equipment.

In some example embodiments of the apparatus, the set of conditions is determined to be satisfied if i) the user equipment is configured to expect to receive said steering of roaming information during registration, ii) the registration type is said emergency registration type, and iii) said steering of roaming information is not already stored at said user equipment.

In some example embodiments of the apparatus, the set of conditions is determined to be satisfied if i) the user equipment is configured to expect to receive said steering of roaming information during registration, ii) the registration type is one of said initial registration type, said mobility registration type, or said emergency registration type, and iii) steering of roaming information is already stored at said user equipment but said mobile network is determined to be located in a country that is different from a country associated with said steering of roaming information already stored at said user equipment.

In some example embodiments of the apparatus, the set of conditions is determined to be satisfied if i) the user equipment is configured to expect to receive said steering of roaming information during registration, ii) the registration type is one of said initial registration type, said mobility registration type, or said emergency registration type, and iii) steering of roaming information is already stored at said user equipment but said mobile network is determined to be different from a previous mobile network associated with said steering of roaming information already stored at said user equipment.

In further example embodiments, a method may be carried out to enable efficient update of steering of roaming information, said method comprising: receiving, from a user equipment (e.g., apparatus 10), a registration request message comprising a steering of roaming information update request; determining, based on at least said registration request message, whether said user equipment expects to receive steering of roaming information; and in an instance in which it is determined that said user equipment expects to receive steering of roaming information, providing said steering of roaming information to said user equipment. Said method can be carried out by an apparatus (e.g., network node 500).

In some further example embodiments, an apparatus (e.g., network node 500) is provided for enabling efficient update of steering of roaming information, said apparatus comprising: means for receiving, from a user equipment, a registration request message comprising a steering of roaming information update request; means for determining, based on at least said registration request message, whether said user equipment expects to receive steering of roaming information; and means for, in an instance in which it is determined that said user equipment expects to receive steering of roaming information, providing said steering of roaming information to said user equipment.

In some further example embodiments, a computer program product is provided, said computer program product comprising a non-transitory computer readable medium including program code which, when executed, causes at least: receiving, from a user equipment, a registration request message comprising a steering of roaming information update request; determining, based on at least said registration request message, whether said user equipment expects to receive steering of roaming information; and in an instance in which it is determined that said user equipment expects to receive steering of roaming information, providing said steering of roaming information to said user equipment. Said computer program product may be stored by or on an apparatus (e.g., network node 500) or a component thereof. Said computer code can be executed by an apparatus (e.g., network node 500).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be improved UE configuration.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What we claim is:

1. An apparatus comprising:
   at least one processor; and at least one memory including computer program code, the at least one memory and the computer program code configured to, with the at least one processor, cause the apparatus to at least:
   generate a registration request message comprising a steering of roaming information update request; and
   cause transmission of said registration request message to a network entity of a mobile network,
   wherein said registration request message comprises an indication of a registration type, said registration type selected from among an initial registration type, a mobility registration type, or an emergency registration type.

2. The apparatus of claim 1, wherein said registration request message further comprises an indication that a set of conditions has been satisfied, said indication operable for said network entity to determine whether to trigger retrieval of the most up-to-date steering of roaming information from a home network of said apparatus to said apparatus.

3. The apparatus of claim 2, wherein said set of conditions is determined to be satisfied in an instance i) the apparatus is configured to expect to receive said steering of roaming information during registration, ii) the registration type is said initial registration type or said emergency registration type, and iii) said steering of roaming information is not already stored at said apparatus.

4. A method comprising:
   generating a registration request message associated with a user equipment, said registration request message comprising a steering of roaming information update request; and
   causing transmission of said registration request message to a network entity of a mobile network,
   wherein said registration request message comprises an indication of a registration type, said registration type selected from among an initial registration type, a mobility registration type, or an emergency registration type.

5. The method of claim 4, wherein said registration request message further comprises an indication that a set of conditions has been satisfied, said indication operable for said network entity to determine whether to trigger retrieval of the most up-to-date steering of roaming information from a home network of said user equipment.

6. The method of claim 5, wherein said set of conditions is determined to be satisfied in an instance i) the user equipment is configured to expect to receive said steering of roaming information during registration, ii) the registration type is said initial registration type or said emergency registration type, and iii) said steering of roaming information is not already stored at said user equipment.

7. A computer program product comprising a non-transitory computer readable medium including program code which, when executed, causes at least:
generating a registration request message associated with a user equipment, said registration request message comprising a steering of roaming information update request; and
causing transmission of said registration request message to a network entity of a mobile network,
wherein said registration request message comprises an indication of a registration type, said registration type selected from among an initial registration type, a mobility registration type, or an emergency registration type.

8. An apparatus comprising:
at least one processor; and at least one memory including computer program code, the at least one memory and the computer program code configured to, with the at least one processor, cause the apparatus to at least:
receive, from a user equipment, a registration request message comprising an indication of a registration type, said registration type selected from among an initial registration type, a mobility registration type, or an emergency registration type;
determine, based on said registration request message, whether said user equipment expects to receive steering of roaming information; and
in an instance in which it is determined that said user equipment expects to receive said steering of roaming information, trigger retrieval of said steering of roaming information from a home network of said user equipment.

9. The apparatus of claim 8, wherein said registration request message further comprises an indication that a set of conditions has been satisfied, said indication operable for said apparatus to determine whether to trigger retrieval of said steering of roaming information from said home network of said user equipment in response to receiving said registration request message.

10. The apparatus of claim 9, wherein said set of conditions is determined to be satisfied in an instance i) the user equipment is configured to expect to receive said steering of roaming information during registration, ii) the registration type is said initial registration type, and iii) said steering of roaming information is not already stored at said user equipment.

11. The apparatus of claim 9, wherein said set of conditions is determined to be satisfied in an instance i) the user equipment is configured to expect to receive said steering of roaming information during registration, ii) the registration type is said emergency registration type, and iii) said steering of roaming information is not already stored at said user equipment.

12. The apparatus of claim 8, wherein the apparatus is configured to, in an instance in which it is determined that user equipment subscription information is not stored at the apparatus, trigger retrieval of said steering of roaming information together with said user equipment subscription information from said home network of said user equipment.

13. The apparatus of claim 8, wherein the apparatus is configured to, in an instance in which it is determined that user equipment subscription information is already stored at the apparatus, trigger retrieval of said steering of roaming information from said home network of said user equipment using a dedicated operation for obtaining only said steering of roaming information from said home network.

14. A method comprising:
receiving, from a user equipment, a registration request message comprising an indication of a registration type, said registration type selected from among an initial registration type, a mobility registration type, or an emergency registration type;
determining, based on at least said registration request message, whether said user equipment expects to receive steering of roaming information; and
in an instance in which it is determined that said user equipment expects to receive said steering of roaming information, triggering retrieval of said steering of roaming information from a home network of said user equipment.

15. The method of claim 14, wherein said registration request message further comprises an indication that a set of conditions has been satisfied, said indication operable for determining whether to trigger retrieval of said steering of roaming information from the home network of said user equipment in response to receiving said registration request message.

16. The method of claim 15, wherein said set of conditions is determined to be satisfied in an instance i) the user equipment is configured to expect to receive said steering of roaming information during registration, ii) the registration type is said initial registration type, and iii) said steering of roaming information is not already stored at said user equipment.

17. The method of claim 15, wherein said set of conditions is determined to be satisfied in an instance i) the user equipment is configured to expect to receive said steering of roaming information during registration, ii) the registration type is said emergency registration type, and iii) said steering of roaming information is not already stored at said user equipment.

18. The method of claim 14, wherein, in an instance in which it is determined that user equipment subscription information is not already stored at a network node of a mobile network, said triggering comprises triggering retrieval of said steering of roaming information together with said user equipment subscription information from said home network of said user equipment.

19. The method of claim 14, wherein, in an instance in which it is determined that user equipment subscription information is already stored at a network node of a mobile network, said triggering comprises triggering retrieval of said steering of roaming information from said home network of said user equipment using a dedicated operation for obtaining only said steering of roaming information from said home network.

20. A computer program product comprising a non-transitory computer readable medium including program code which, when executed, causes at least:
receiving, from a user equipment, a registration request message comprising an indication of a registration type, said registration type selected from among an initial registration type, a mobility registration type, or an emergency registration type;

determining, based on at least said registration request message, whether said user equipment expects to receive steering of roaming information; and in an instance in which it is determined that said user equipment expects to receive said steering of roaming information, triggering retrieval of said steering of roaming information from a home network of said user equipment.

\* \* \* \* \*